April 14, 1925.
F. O. KICHLINE ET AL
1,533,741
METALLURGICAL PROCESS
Filed June 13, 1924
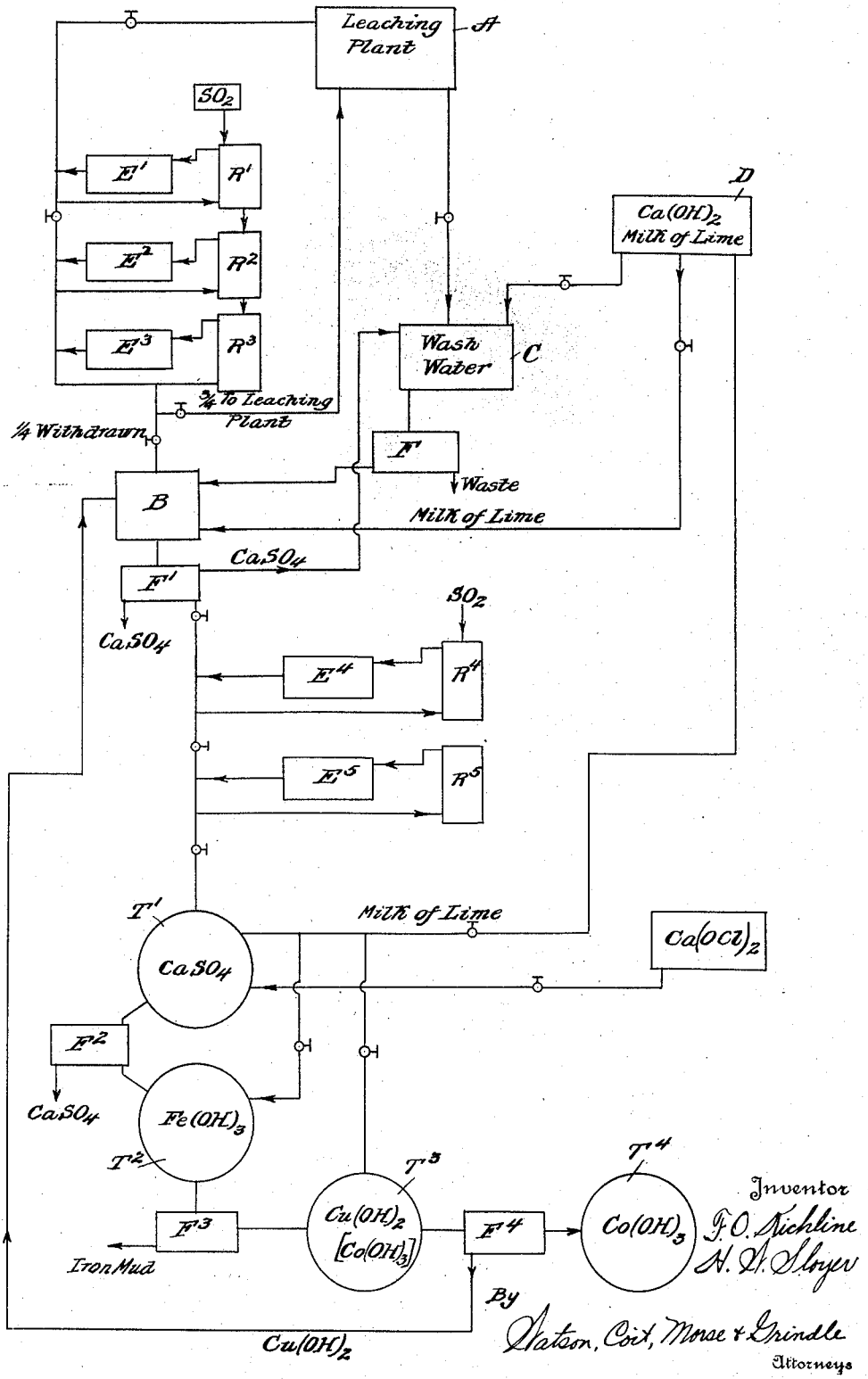

Patented Apr. 14, 1925.

1,533,741

UNITED STATES PATENT OFFICE.

FRANK O. KICHLINE AND HAROLD W. SLOYER, OF LEBANON, PENNSYLVANIA, ASSIGNORS TO BETHLEHEM STEEL COMPANY, A CORPORATION OF PENNSYLVANIA.

METALLURGICAL PROCESS.

Application filed June 13, 1924. Serial No. 719,877.

*To all whom it may concern:*

Be it known that we, FRANK O. KICHLINE and HAROLD W. SLOYER, citizens of the United States, and residents of Lebanon, in the county of Lebanon and State of Pennsylvania, have invented certain new and useful Improvements in Metallurgical Processes, of which the following is a specification.

This invention relates to an electrolytic process for recovering copper and other metals from solutions, particularly solutions which are more or less impure and difficult to electrolyze on account of the presence of deleterious salts such as the salts of iron. The general process of the kind to which this invention relates is disclosed in the U. S. Patents to W. E. Greenawalt, Nos. 1,353,-995 and 1,357,495. This prior process, as generally practiced, consists in first roasting the ores containing copper and other metals in a suitable apparatus to render the same soluble, leaching the roasted ores to obtain a soluble electrolyte and subjecting the electrolyte to electrolysis using an insoluble anode. In leaching there is generally obtained a rich copper solution, and a lean copper solution, the first results from the application of the standard leaching acid solution, and the second from the application of wash water in an endeavor to remove all the soluble values from the ores after the rich solution is withdrawn. The rich solution so obtained is subjected to electrolysis. It is not possible, however, to completely remove the copper by electrolysis. In this prior process, therefore, a serious problem arises in winning from the wash water and from the impoverished electrolyte the small amounts of copper and other metals contained therein. Heretofore these final percentages of copper in the wash water and the impoverished electrolyte have been recovered or sought to be recovered by precipitating the copper with iron or hydrogen sulphide, producing either cement copper or copper sulphide which by suitable means are returned to the system for electrolysis. In the case of the rich solution which is subjected to electrolysis, as above noted, some of the copper is deposited; acid is regenerated by the same action; the partly impoverished electrolyte with its regenerated acid is returned to the leaching plant to dissolve more copper and thus continue the cycle. Part of this impoverished electrolyte solution, however, is continuously bled or withdrawn from the system to avoid the building up of impurities to an undesirable amount. The copper in this last mentioned portion of the withdrawn and fouled electrolyte is usually precipitated by iron or hydrogen sulphide as in the case of the wash water. During the electrolysis, as above described, the ferrous salts of iron are to a considerable extent oxidized to ferric salts which are detrimental and as the process is usually practiced, the electrolyte is subjected to the action of sulphur dioxide to reduce the ferric salts to the ferrous condition.

The present invention is concerned particularly with the recovery of the values from the wash water and from the portion of the fouled electrolyte withdrawn from the system as above described. The use of hydrogen sulphide or iron for recovery of the copper from such solutions is more or less unsatisfactory. The copper is recovered in an undesirable form and is difficult to handle, and, furthermore, such treatment is open to serious objection because it does not result in recovery of any other metals which may be present in the ores. According to the present invention, the copper present in the wash water solution and in the impoverished portion of electrolyte solution withdrawn from the system is completely removed and in the most desirable form, namely as cathode copper; also by the present process the recovery of other metals in these lean solutions, such particularly as cobalt, nickel, manganese, and zinc, is rendered possible which is a point of great importance.

The accompanying drawing is a diagrammatic flow sheet of an arrangement illustrating the present invention, this drawing showing certain general features of the prior process in order to facilitate understanding of the present improvement.

Referring to the drawing in detail, A indicates generally the leaching vat or plant from which the rich electrolyte is conducted successively to the electrolyzers indicated at $E'$, $E^2$ and $E^3$ and the reducers $R'$, $R^2$ and $R^3$ where a considerable portion of the copper is deposited and the ferric iron reduced by sulphur dioxide supplied from any suitable source as set forth in said prior patents. Any desired number of electrolyzers and reducers may be employed. From the last of the electrolyzers, a portion, preferably about three-fourths, of the electrolyte, now enriched in acid, is returned, as indicated, to the leaching plant, the rest of the electrolyte, approximately one-fourth, is withdrawn from the system in order to prevent excessive fouling of the electrolyte by undue accumulation of undesirable constituents therein. The foregoing steps are those generally employed in carrying out the prior process above mentioned.

According to the present invention, the withdrawn portion of the electrolyte solution which is comparatively strong in acid, containing generally from three to seven per cent, is conducted into a suitable chamber or vat B. The lean copper solution or wash water from the leaching plant is led into a suitable tank as C where it is treated with a suitable alkali, preferably milk of lime, although any other alkali may be used. We have also found that precipitated calcium or magnesium carbonate or even powdered limestone or dolomite may be employed for this purpose. However we prefer to use milk of lime which may be supplied from any suitable source as the tank D. This is added in sufficient quantity to precipitate the metals in the wash water according to the following reactions:

$$CuSO_4 + Ca(OH)_2 = Cu(OH)_2 + CaSO_4$$
$$NiSO_4 + Ca(OH)_2 = Ni(OH)_2 + CaSO_4$$
$$CoSO_4 + Ca(OH)_2 = Co(OH)_2 + CaSO_4$$
$$FeSO_4 + Ca(OH)_2 = Fe(OH)_2 + CaSO_4$$

Some basic copper sulphate is also formed as follows:

$$2CuSO_4 + Ca(OH)_2 = Cu_2(OH)_2SO_4 + CaSO_4.$$

Similar reactions would take place in the case of manganese or zinc if such metals were present. All of the compounds on the right side of these equations, copper hydrate, nickel hydrate, cobalt hydrate, basic copper sulphate, ferrous hydrate, and calcium sulphate are insoluble and hence precipitate. These precipitated hydrates are voluminous (especially cobalt hydrate), difficult to settle to small volume and difficult to filter. It has been found that if some calcium sulphate is added to the wash water, filtration of these voluminous precipitates will be facilitated and such calcium sulphate may be returned from a subsequent step in the process as later pointed out.

The above precipitates, whether settled or not, are removed from the wash water by means of filtration through any suitable filter as indicated at F. The filtrate is discarded and the precipitate, which it is not necessary to wash, is added to the withdrawn portion of the electrolyte in the vat or chamber B. This withdrawn electrolyte, as before mentioned, is comparatively low in copper and high in acid, and is therefore an unattractive solution for further removal of copper by electrolysis. This solution, however, is greatly benefited by the addition of the precipitates from the wash water because the percentage of copper is increased and the acidity of the solution is accordingly diminished. The reactions which take place upon the addition of the precipitates from the wash water to the withdrawn electrolyte in the chamber B are as follows:

$$Cu(OH)_2 + H_2SO_4 = CuSO_4 + 2H_2O$$
$$Ni(OH)_2 + H_2SO_4 = NiSO_4 + 2H_2O$$
$$Co(OH)_2 + H_2SO_4 = CoSO_4 + 2H_2O$$
$$Cu_2SO_4(OH)_2 + H_2SO_4 = 2CuSO_4 + 2H_2O.$$

Similar reactions would take place with other metals present. By these reactions, it will be seen that part of the acid in the electrolyte is neutralized. In order to prepare the solution in the vat or chamber B for further recovery of copper by electrolysis, it is desirable to neutralize nearly all of the acid contained therein. This solution may therefore be further neutralized by the addition thereto of any suitable reagent preferably calcium hydroxide in the form of milk of lime. This may be supplied to the chamber B from the tank D as indicated. As a result of the foregoing, an electrolyte is obtained which is low in acid or nearly neutral and which is enriched in copper, and this solution after being filtered through a suitable filter as F' to remove $CaSO_4$ and any other solid matter is subjected to further electrolysis in the usual manner in electrolyzers indicated at $E^4$ and $E^5$ to which reducers $R^4$ and $R^5$ are connected and supplied with sulphur dioxide as described above in connection with the prior stages of electrolysis. The solution flowing from the vat or chamber B is ideal for electrolysis and it is found that copper can be deposited from such electrolyte until it is almost free from this metal.

The final tail solution leaving the electrolyzer $E^5$ contains only a very small percentage of copper, even as low as $\frac{1}{10}\%$. The solution is now treated to remove this small residual copper and separate it from the other metal values, such as cobalt, nickel, etc., which it is desired to recover. To do this, the principle of fractional precipitation is employed. The tail solution is treated with an alkali, preferably milk of lime, in a vat as T' and thoroughly agitated, the lime being in sufficient quantity to nearly, but not quite, neutralize the acid. This results in precipitation of $CaSO_4$ which is removed by a filter as $F^2$. In this vat the solution is also preferably treated with an oxidizing reagent to change the iron from the ferrous to the ferric state so that it may be later precipitated. The oxidizing reagent used is preferably calcium hypochlorite $Ca(OCl)_2$ and the resulting reaction as follows:

$$4FeSO_4 + Ca(OCl)_2 + 2H_2SO_4 = 2Fe_2(SO_4)_3 + CaCl_2 + 2H_2O$$

The solution which is now low in acid but not neutral, is filtered through a filter as $F^2$ to remove the precipitated calcium sulphate, and then passed into a second vat as $T^2$. In this vat the addition of milk of lime is continued until the iron is practically all precipitated, this action being assisted by heat and the iron being in the ferric state. This precipitate is removed as iron mud by a filter as $F^3$. Upon further addition of milk of lime in the vat $T^3$, the remaining copper will be precipitated along with a small amount of the cobalt. This precipitated copper is removed by a filter as $F^4$ and is returned to the system preferably being added to the solution in the vat B in which it is dissolved by the acid of this solution. It may be pointed out that cobalt, nickel, etc., will not be precipitated in the vats $T'$ and $T^2$ because the solution is slightly acid, while in the vat $T^3$ copper will be precipitated first because it is a stronger base than cobalt, nickel, etc., from which it is to be separated. The waste solution of the vat $T^3$ after precipitating the copper is in the most advantageous condition for recovery of other metal values, such particularly as cobalt and nickel, which may be done by precipitation or any other desired manner.

As already noted, it has been found of advantage to return some of the calcium sulphate from the filter $F'$ to the tank C as this will facilitate filtration of the voluminous precipitates there produced.

Having thus described our invention what we claim as new and desire to be secured by Letters Patent is:

1. A metallurgical process for recovering copper from its ores comprising first treating the ores with an acid solution to dissolve the copper, whereby a relatively rich copper solution is obtained, and then treating the same with wash water, whereby a relatively lean copper solution is obtained, maintaining separate the resulting rich and lean copper solutions, electrolyzing the rich copper solution to deposit copper therefrom, withdrawing from the electrolyzing system a portion of the electrolyte solution after the same has been subjected to electrolysis, precipitating the copper in said lean solution, adding said precipitate to said withdrawn portion of electrolyte, and electrolyzing the solution thus obtained to deposit copper therefrom.

2. A metallurgical process for recovering copper from its ores comprising first treating the ores with an acid solution to dissolve the copper, whereby a relatively rich copper solution is obtained, and then treating the same with wash water, whereby a relatively lean copper solution is obtained, maintaining separate the resulting rich and lean copper solutions, electrolyzing the rich copper solution to deposit copper therefrom, withdrawing from the electrolyzing system a portion of the electrolyte solution after the same has been subjected to electrolysis, precipitating the copper in said lean solution, adding said precipitate to said withdrawn portion of electrolyte, electrolyzing the solution thus obtained to deposit copper therefrom, precipitating the residue of copper from the last named solution after the same has been electrolyzed, and adding said last named precipitate to the solution withdrawn from the first named electrolyzing system.

3. A metallurgical process for recovering copper from its ores comprising first treating the ores with an acid solution to dissolve the copper, whereby a relatively rich copper solution is obtained, and then treating the same with wash water, whereby a relatively lean copper solution is obtained, maintaining separate the resulting rich and lean copper solutions, electrolyzing the rich copper solution to deposit copper therefrom, withdrawing from the electrolyzing system a portion of the electrolyte solution after the same has been subjected to electrolysis, treating said lean solution with an alkali to precipitate the copper therefrom, adding the precipitate to said withdrawn portion of electrolyte, and electrolyzing the solution thus obtained to deposit copper therefrom.

4. A metallurgical process for recovering copper from its ores, comprising first treating the ores with an acid solution to dissolve the copper, whereby a relatively rich copper solution is obtained, and then treating the same with wash water, whereby a relatively lean copper solution is obtained, maintaining separate the resulting rich and lean copper solutions, electrolyzing the rich copper solution to deposit copper therefrom, withdrawing from the electrolyzing system a portion of the electrolyte solution after the same has been subjected to electrolysis, treating said lean solution with an alkali to precipitate the copper therefrom, adding the precipitate to said withdrawn portion of electrolyte, treating said withdrawn portion of electrolyte with an alkali to further neutralize the acid therein, and electrolyzing the solution thus obtained to deposit copper therefrom.

5. A metallurgical process for recovering copper from its ores comprising first treating the ores with an acid solution to dissolve the copper, whereby a relatively rich copper solution is obtained, and then treating the ores with wash water, whereby a relatively lean copper solution is obtained, maintaining separate the resulting rich and lean copper solutions, electrolyzing the rich copper solution to deposit copper therefrom, withdrawing from the electrolyzing system a portion of the electrolyte solution after the same has been subjected to electrolysis, treating said lean solution with an alkali to precipitate the copper therefrom, adding the precipitate to said withdrawn portion of electrolyte, electrolyzing the solution thus obtained to deposit copper therefrom, treating said last named solution after electrolysis of the same with an alkali to precipitate copper therefrom and adding said last named precipitate to the solution withdrawn from the first named electrolyzing system.

6. A metallurgical process for recovering copper from its ores comprising first treating the ores with an acid solution to dissolve the copper, whereby a relatively rich copper solution is obtained, and then treating the ores with wash water, whereby a relatively lean copper solution is obtained, maintaining separate the resulting rich and lean copper solutions, electrolyzing the rich copper solution to deposit copper therefrom, withdrawing from the electrolyzing system a portion of the electrolyte solution after the same has been subjected to electrolysis, treating said lean solution with milk of lime to precipitate the copper therefrom, adding said precipitate to said withdrawn portion of electrolyte, electrolyzing the solution thus obtained to deposit copper therefrom, treating said last named solution after electrolysis of the same with milk of lime to precipitate copper therefrom, and adding said last named precipitate to the solution withdrawn from the first named electrolyzing system.

7. A metallurgical process for recovering copper from its ores comprising treating the ores with an acid solution to dissolve the copper, electrolyzing the solution thus obtained to deposit copper therefrom, withdrawing from the electrolyzing system a portion of the electrolyte solutions therein after the same has been electrolyzed, partially neutralizing the acid in said withdrawn solution, electrolyzing said withdrawn solution to further deposit copper therefrom, precipitating the residue of copper from the last named solution after it is electrolyzed and adding said precipitate to the solution withdrawn from the first named electrolyzing system.

8. A metallurgical process for treating ores containing copper and other metals in order to recover the copper and separate the same from the other metals, which comprises first treating the ores with an acid solution to dissolve the copper and other metals, electrolyzing the solution thus obtained to deposit copper therefrom, withdrawing from the electrolyzing system a portion of the electrolyte solution therein after the same has been subjected to electrolysis, partially neutralizing said withdrawn solution, subjecting said withdrawn solution to further electrolysis to deposit copper therefrom, precipitating the copper from said last named solution after the same has been electrolyzed, whereby a tail solution containing the other metals is obtained.

9. A metallurgical process for treating ores containing copper and other metals in order to recover the copper and separate the same from the other metals, which comprises first treating the ores with an acid solution to dissolve the copper and other metals, electrolyzing the solution thus obtained to deposit copper therefrom, withdrawing from the electrolyzing system a portion of the electrolyte solution therein after the same has been subjected to electrolysis, partially neutralizing said withdrawn solution, subjecting said withdrawn solution to further electrolysis to deposit copper therefrom, precipitating the copper from said last named solution after the same has been electrolyzed, whereby a tail solution containing the other metals is obtained, and adding said copper precipitate to said solution withdrawn from the first named electrolyzing system.

10. A metallurgical process for treating ores containing copper and other metals in order to recover the copper and separate the same from the other metals, which comprises first treating the ores with an acid solution to dissolve the copper and other metals, whereby a relatively rich solution of the metals is obtained, and then treating the same with wash water whereby a relatively lean solution of the metals is obtained, maintaining separate the resulting rich and lean solutions, electrolyzing the rich solution to deposit copper therefrom, withdrawing from the electrolyzing system a portion of the electrolyte solution after the same is electrolyzed, precipitating the copper and other metals from said lean solution, adding said precipitate to said withdrawn portion of electrolyte, electrolyzing the solution thus obtained to further deposit copper therefrom, precipitating the residue of copper from the last named solution after the same has been electrolyzed, whereby a solution containing the other metals is obtained.

11. A metallurgical process for treating ores containing copper and other metals in order to recover the copper and separate the same from the other metals, which comprises first treating the ores with an acid solution to dissolve the copper and other metals, whereby a relatively rich solution of the metals is obtained, and then treating the same with wash water whereby a relatively lean solution of the metals is obtained, maintaining separate the resulting rich and lean solutions, electrolyzing the rich solution to deposit copper therefrom, withdrawing from the electrolyzing system a portion of the electrolyte solution after the same is electrolyzed, precipitating the copper and other metals from said lean solution, adding said precipitate to said withdrawn portion of electrolyte, electrolyzing the solution thus obtained to further deposit copper therefrom, precipitating the residue of copper from the last named solution after the same has been electrolyzed, whereby a solution containing the other metals is obtained and adding said copper precipitate to the solution withdrawn from the first named electrolyzing system.

12. In a metallurgical process of the kind described, the steps of withdrawing a portion of the electrolyte from a system in which a solution containing copper and other metal values is subjected to electrolysis, partially neutralizing such withdrawn portion of the electrolyte, and subjecting the same to further electrolysis to further remove copper therefrom, whereby a tail solution substantially free from copper and containing the other metal values is obtained.

13. In a metallurgical process of the kind described in which ores containing copper and other metal values are first treated to obtain a rich solution for electrolysis and further treated with wash water to obtain a lean solution, the steps of withdrawing a portion of the electrolyte from the system in which the rich solution is electrolyzed, precipitating the metal values from said lean solution, adding said precipitate to said withdrawn electrolyte to partially neutralize the same, and then subjecting said partially neutralized solution to further electrolysis to remove copper therefrom whereby a tail solution containing the other metal values is obtained.

In testimony whereof we hereunto affix our signatures.

FRANK O. KICHLINE.
HAROLD W. SLOYER.